US012768438B2

(12) United States Patent
Flores Fernandez et al.

(10) Patent No.: US 12,768,438 B2
(45) Date of Patent: Oct. 20, 2026

(54) ADJUSTABLE ANGLE BRACKET

(71) Applicant: INTELLIGRATED HEADQUARTERS, LLC, Mason, OH (US)

(72) Inventors: Aide Fernanda Flores Fernandez, Mexico City (MX); Jesus Anselmo Morelos Ku, Mexico City (MX)

(73) Assignee: Intelligrated Headquarters, LLC, Mason, OH (US)

( * ) Notice: Subject to any disclaimer, the term of this patent is extended or adjusted under 35 U.S.C. 154(b) by 290 days.

(21) Appl. No.: 18/353,412

(22) Filed: Jul. 17, 2023

(65) Prior Publication Data

US 2025/0027559 A1 Jan. 23, 2025

(51) Int. Cl.

*F16M 11/08* (2006.01)
*F16H 57/023* (2012.01)
*F16M 11/06* (2006.01)
*F16H 57/02* (2012.01)

(52) U.S. Cl.

CPC . *F16H 57/023* (2013.01); *F16H 2057/02021* (2013.01); *F16M 11/06* (2013.01); *F16M 11/08* (2013.01)

(58) Field of Classification Search

CPC ........ F16M 11/06; F16M 11/08; F16M 11/10; F16M 13/022

USPC ....... 248/122.1, 125.7, 125.9, 346.01, 346.5, 248/200, 274.1

See application file for complete search history.

(56) References Cited

U.S. PATENT DOCUMENTS

| | | | | |
|---|---|---|---|---|
| 6,045,103 A * | 4/2000 | Costa | F16M 11/10 248/278.1 |
| 6,926,241 B2 * | 8/2005 | Garrett | E06C 7/426 248/229.1 |
| 9,123,987 B2 * | 9/2015 | Lettkeman | H01Q 1/1221 |
| 12,196,365 B1 * | 1/2025 | Anselmo | F16M 13/022 |

(Continued)

FOREIGN PATENT DOCUMENTS

| | | |
|---|---|---|
| CN | 214327250 U | 10/2021 |
| KR | 10-2392116 B1 | 4/2022 |

OTHER PUBLICATIONS

Felipe Machado et al., “Parametric CAD modeling for open source scientific hardware: Comparing OpenSCAD and FreeCAD Python scripts,” PLoS One, 14(12):1-30, (Dec. 5, 2019). [Retrieved from the Internet Oct. 17, 2023: URL: <https://journals.plos.org/plosone/article?id=10.1371/journal.pone.0225795>].

(Continued)

*Primary Examiner* — Alfred J Wujciak

(74) *Attorney, Agent, or Firm* — Alston & Bird LLP

(57) ABSTRACT

An example adjustable angle bracket is provided. The adjustable angle bracket can include a base having a rectangular shape. The adjustable angle bracket can include a first lug having a top edge and a bottom edge, where the bottom edge of the first lug is coupled to the base, and where the first lug defines a first set of slots. The adjustable angle bracket can include a second lug having a top edge and a bottom edge, where the bottom edge of the second lug is coupled to the base, and where the second lug defines a second set of slots. The first set of slots can define a plurality of angles relative to a direction D orthogonal to the base. The second set of slots can define the plurality of angles relative to the direction D.

8 Claims, 7 Drawing Sheets

(56) References Cited

U.S. PATENT DOCUMENTS

| | | | | |
|---|---|---|---|---|
| 2010/0259462 | A1* | 10/2010 | Yeh | H01Q 3/02<br>343/882 |
| 2013/0256477 | A1* | 10/2013 | Fackler | F16M 11/2014<br>248/288.11 |
| 2019/0250251 | A1* | 8/2019 | Gibson | G01S 17/10 |
| 2022/0403976 | A1* | 12/2022 | Morrison | F16M 13/027 |
| 2023/0087857 | A1* | 3/2023 | Anselmo | F16M 11/2078<br>248/200 |
| 2025/0122736 | A1* | 4/2025 | Mastalir | E06C 7/426 |

OTHER PUBLICATIONS

Strong Hand Tools, "Adjustable Angle Block", retrieved from the Internet at URL: <https://stronghandtools.com/products/t50121?_pos=1&_sid=72cfd55bc&_ss=r> on Oct. 17, 2023, 1 page.

Tekno Mega, "Bracket with adjustable angle", retrieved from the Internet at URL: <https://www.teknomega.com/solutions-for-industrial-installations/profiles-cantilever-brackets/galvanized-steel-brackets/bracket-with-adjustable-angle.kl> on Oct. 17, 2023, 1 page.

* cited by examiner

ADJUSTABLE ANGLE BRACKET

TECHNICAL FIELD

The present application relates generally, in some examples, to a bracket. More specifically, the present application relates, in some examples, to a bracket for allowing angle adjustments on an attached gearbox.

BACKGROUND

Gearboxes are often used to operate a conveyor. For example, a gearbox may be secured to a conveyor by a shaft. The inventors have identified numerous deficiencies and problems with the existing technologies in this field. For example, existing technologies may result in a gearbox not being level with the ground when a conveyor is inclined. This may result in a gearbox using an improper amount of oil, shortening its lifespan. Through applied effort, ingenuity, and innovation, many of these identified deficiencies and problems have been solved by developing solutions that are structured in accordance with the embodiments of the present disclosure, many examples of which are described in detail herein.

BRIEF SUMMARY

In an example embodiment, an adjustable angle bracket is provided. The example adjustable angle bracket includes a base having a rectangular shape. The example adjustable angle bracket includes a first lug having a top edge and a bottom edge, where the bottom edge of the first lug is coupled to the base, and where the first lug defines a first set of slots. The example adjustable angle bracket includes a second lug having a top edge and a bottom edge, where the bottom edge of the second lug is coupled to the base, and where the second lug defines a second set of slots. In an example embodiment, the first set of slots define a plurality of angles relative to a direction D orthogonal to the base. In an example embodiments, the second set of slots define the plurality of angles relative to the direction D.

In an example embodiment, each of the first lug and the second lug have a triangular shape.

In an example embodiment, each of the first set of slots and the second set of slots includes three slots.

In an example embodiment, each of the first set of slots and the second set of slots include slots angled at 0 degrees, 9 degrees, and 18 degrees from the direction D.

In an example embodiment, a slot angled at 9 degrees from the direction D is longer than a slot angled at 0 degrees from the direction D, and a slot angled at 18 degrees from the direction D is longer than the slot angled at 9 degrees from the direction D.

In an example embodiment, the base defines a plurality of apertures.

In an example embodiment, the plurality of apertures includes four apertures.

In an example embodiment, the base includes a center, where the apertures are defined further from the center than each of the first lug and the second lug.

An example adjustable angle bracket further includes a lug connector coupled to the top edge of the first lug and the top edge of the second lug.

In an example embodiment, an adjustable gearbox assembly is provided. The example adjustable gearbox assembly includes a conveyor. The example adjustable gearbox assembly includes a gearbox. The example adjustable gearbox assembly includes a fixed bracket defining a plurality of fixed bracket slots. The example adjustable gearbox assembly includes an adjustable angle bracket. In an example embodiment, the adjustable angle bracket includes a base having a rectangular shape. In an example embodiment, the adjustable angle bracket includes a first lug having a top edge and a bottom edge, where the bottom edge of the first lug is coupled to the base, and where the first lug defines a first set of slots. In an example embodiment, the adjustable angle bracket includes a second lug having a top edge and a bottom edge, where the bottom edge of the second lug is coupled to the base, and where the second lug defines a second set of slots. In an example embodiment, the first set of slots defines a plurality of angles relative to a direction D orthogonal to the base. In an example embodiment, the second set of slots defines the plurality of angles relative to the direction D.

In an example embodiment, each of the first lug and the second lug have a triangular shape.

In an example embodiment, each of the first set of slots and the second set of slots includes three slots.

In an example embodiment, each of the first set of slots and the second set of slots includes slots angled at 0 degrees, 9 degrees, and 18 degrees from the direction D.

In an example embodiment, the gearbox is secured to the adjustable angle bracket by at least one bolt extending through at least one slot of the first set of slots and at least one slot of the second set of slots, where the gearbox is configured to be angled in a direction matching the at least one slot of the first set of slots and the at least one slot of the second set of slots.

In an example embodiment, a slot angled at 9 degrees from the direction D is longer than a slot angled at 0 degrees from the direction D, where a slot angled at 18 degrees from the direction D is longer than the slot angled at 9 degrees from the direction D.

In an example embodiment, the base defines a plurality of apertures, wherein the plurality of apertures are secured to the plurality of fixed bracket slots by a plurality of bolts.

In an example embodiment, the plurality of apertures includes four apertures.

In an example embodiment, the gearbox is secured to the adjustable angle bracket by at least one bolt extending through at least one slot of the first set of slots and at least one slot of the second set of slots, where an angle of the gearbox relative to the direction D is adjustable by sliding the adjustable angle bracket along the plurality of fixed bracket slots.

In an example embodiment, the base includes a center, where the apertures are defined further from the center than each of the first lug and the second lug.

In an example embodiment, the adjustable angle bracket includes a lug connector coupled to the top edge of the first lug and the top end of the second lug.

BRIEF DESCRIPTION OF THE DRAWINGS

Figure 1:
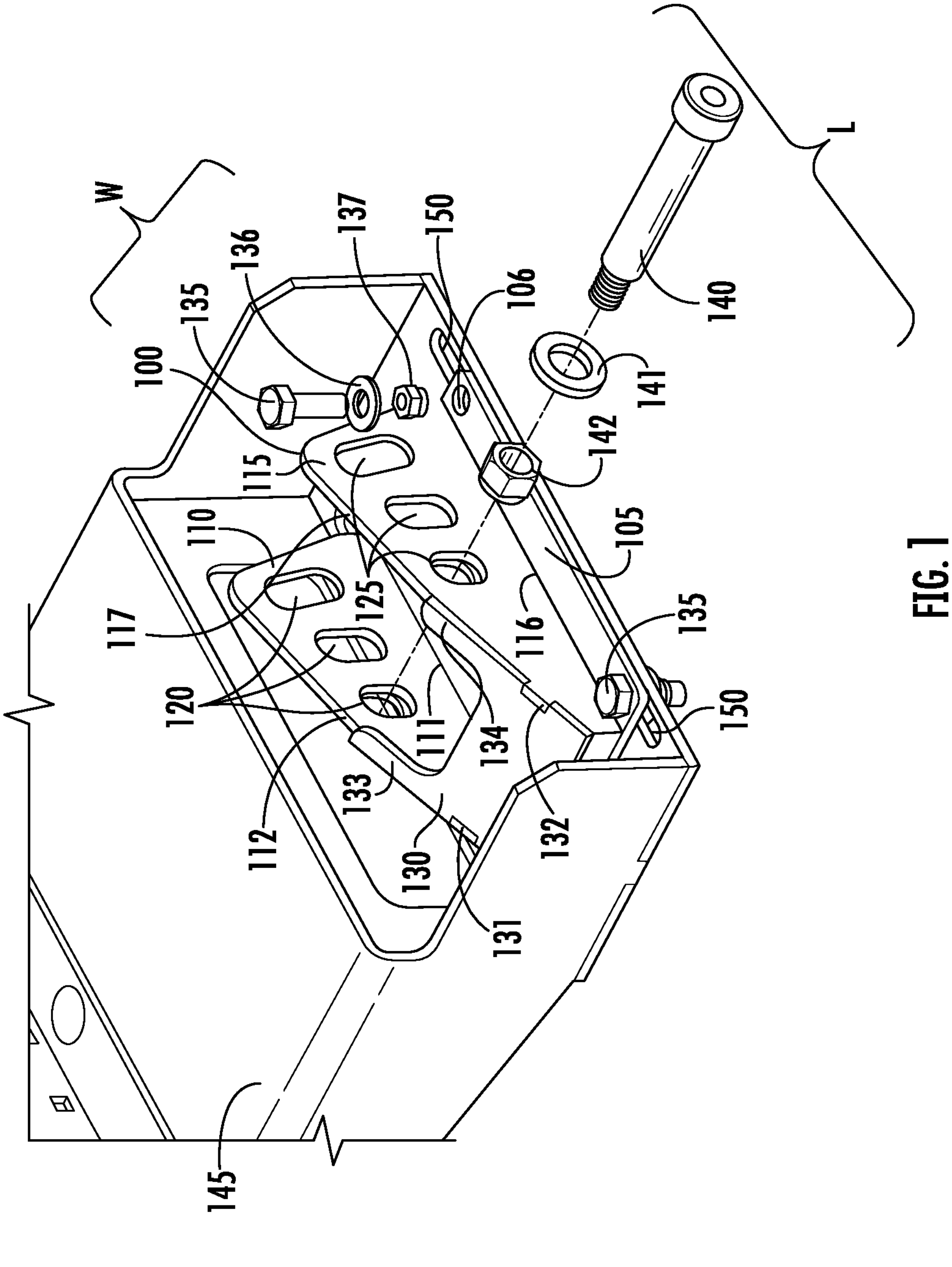

Having thus described certain example embodiments of the present disclosure in general terms above, non-limiting and non-exhaustive embodiments of the subject disclosure are described with reference to the following figures, which are not necessarily drawn to scale and wherein like reference numerals refer to like parts throughout the various views unless otherwise specified. The components illustrated in the figures may or may not be present in certain embodiments described herein. Some embodiments may include fewer (or more) components than those shown in the figures.

FIG. 1 provides a perspective view of an adjustable angle bracket secured to a fixed bracket in accordance with an example embodiment of the present disclosure.

Figure 2C:
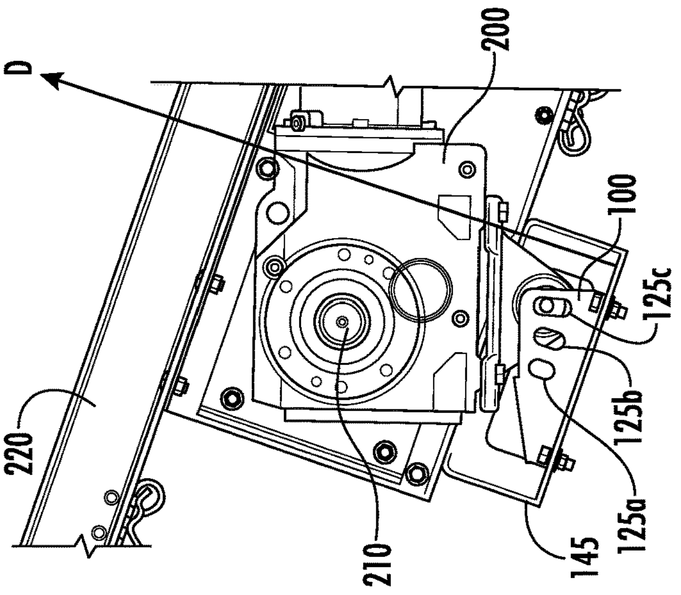
Figure 2B:
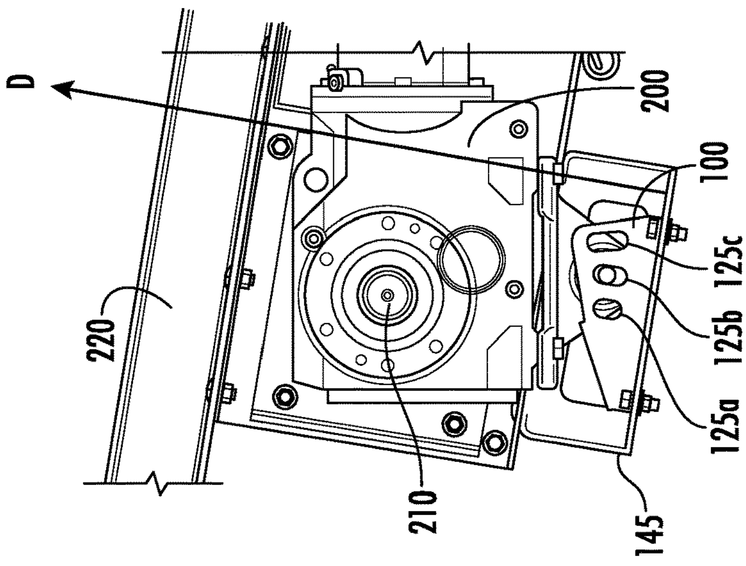
Figure 2A:
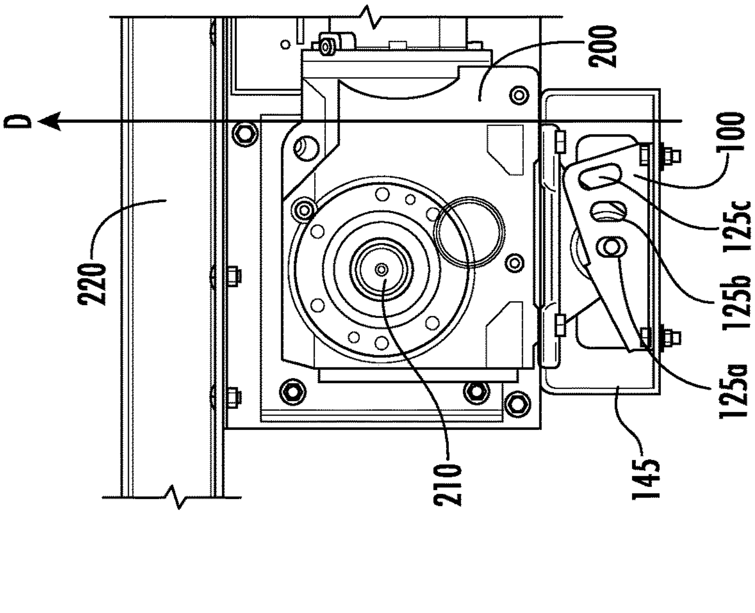

FIGS. 2A-2C provide front views of a gearbox coupled to a set of slots in accordance with example embodiments of the present disclosure.

Figure 3A:
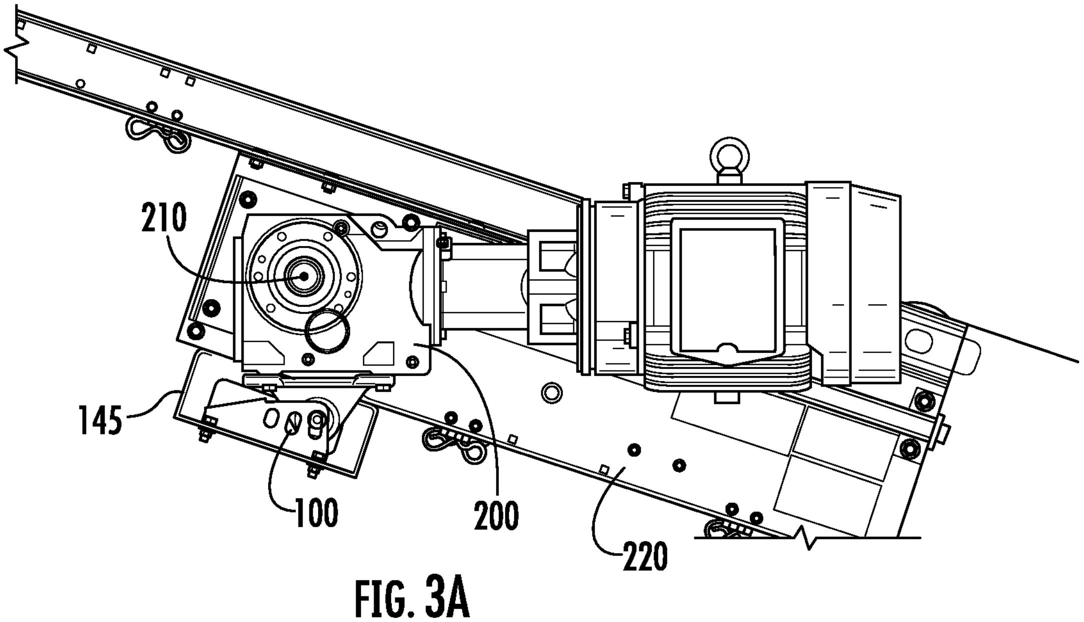
Figure 3B:
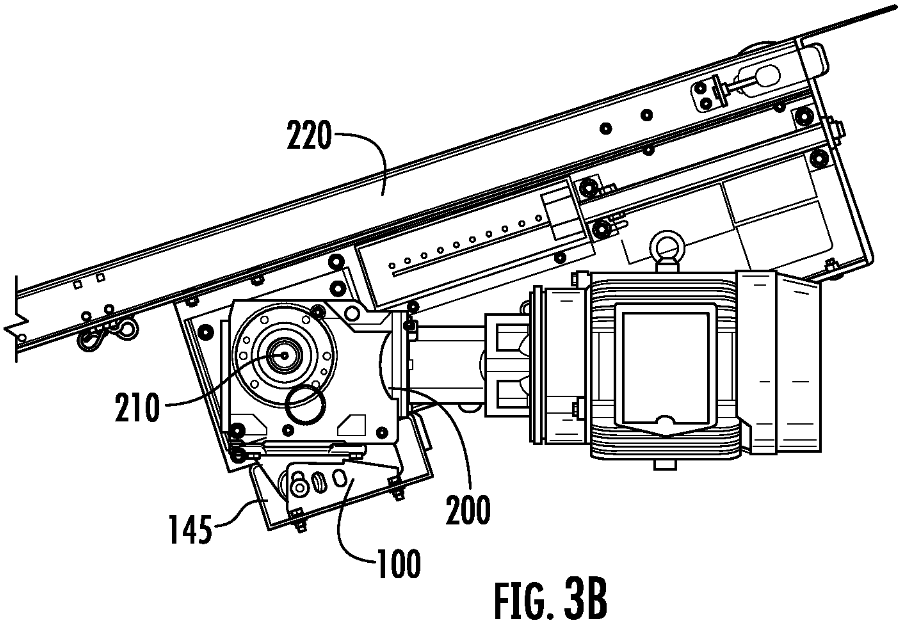

FIGS. 3A-3B provide front views of different orientations of a gearbox in accordance with example embodiments of the present disclosure.

Figure 4A:
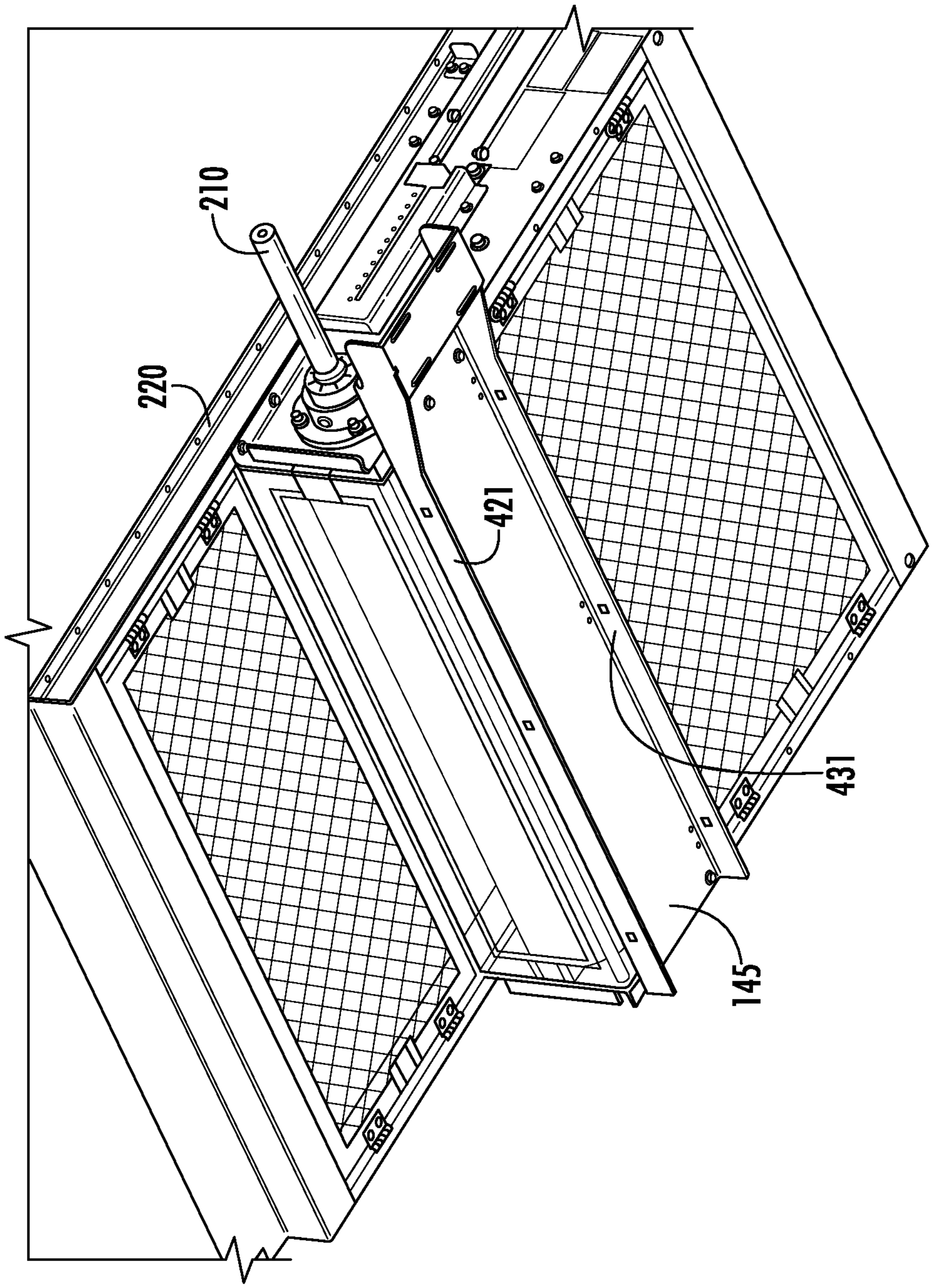

FIG. 4A provides a perspective view of a fixed bracket coupled to a conveyor in accordance with an example embodiment of the present disclosure.

Figure 4B:
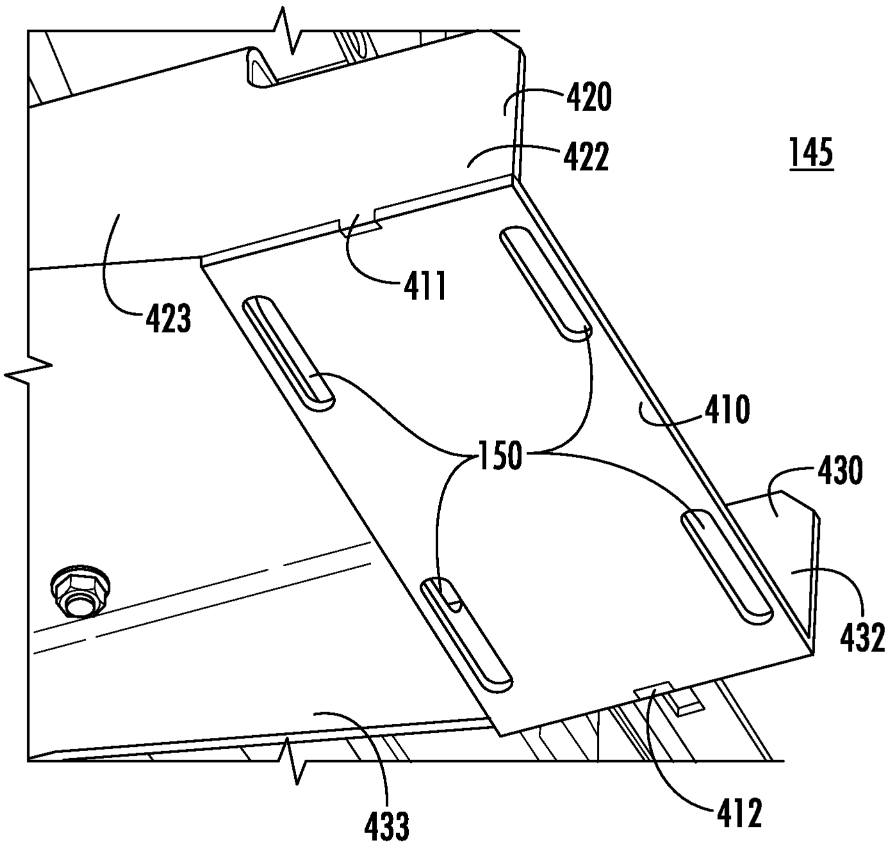

FIG. 4B provides a closeup view of a fixed bracket in accordance with an example embodiment of the present disclosure.

Figure 5:
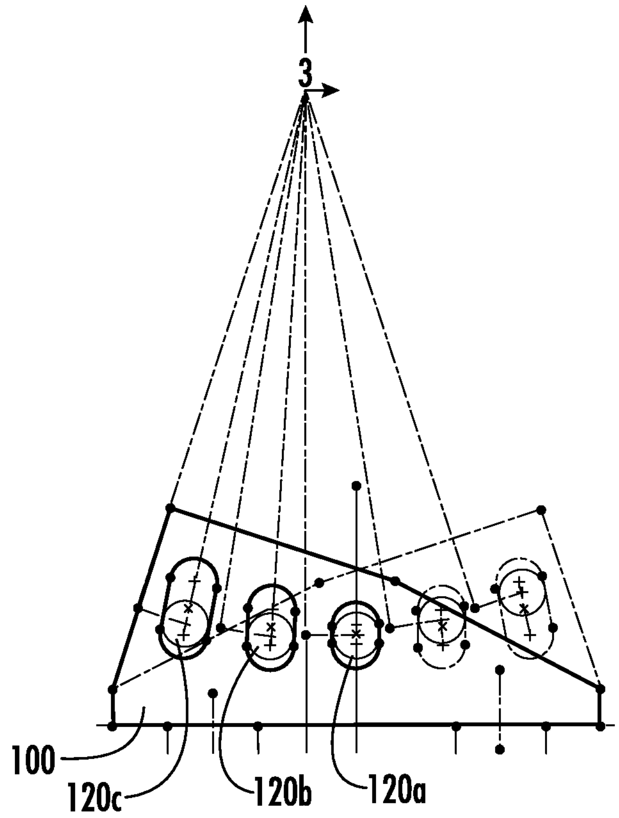

FIG. 5 provides a front view of an adjustable angle bracket in accordance with an example embodiment of the present disclosure.

Figure 6:
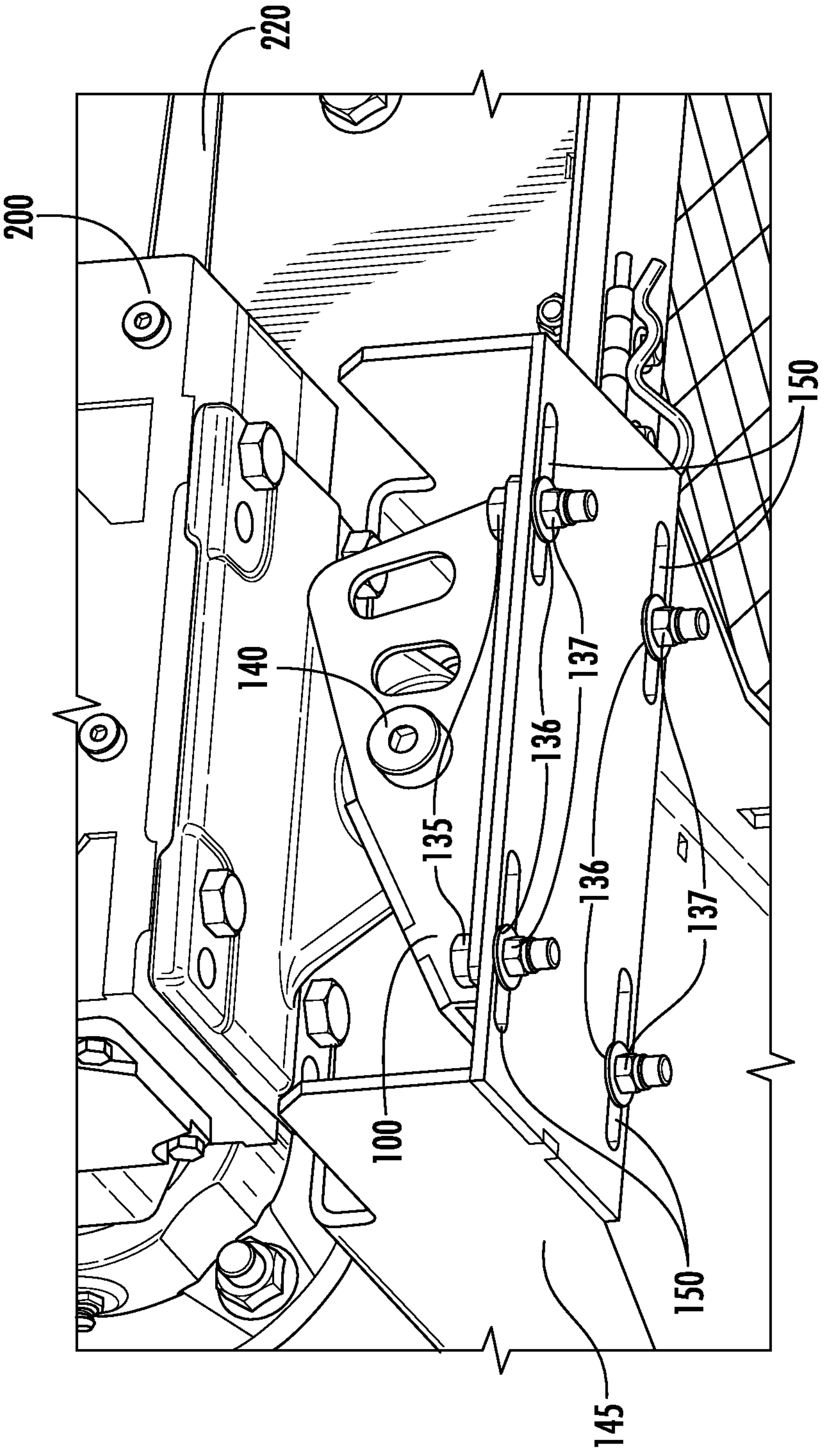

FIG. 6 provides a perspective view of an adjustable gearbox assembly in accordance with an example embodiment of the present disclosure.

DETAILED DESCRIPTION

One or more embodiments are now more fully described with reference to the accompanying drawings, wherein like reference numerals are used to refer to like elements throughout and in which some, but not all embodiments of the inventions are shown. In the following description, for purposes of explanation, numerous specific details are set forth in order to provide a thorough understanding of the various embodiments. It is evident, however, that the various embodiments can be practiced without these specific details. It should be understood that some, but not all embodiments are shown and described herein. Indeed, the embodiments may be embodied in many different forms, and accordingly this disclosure should not be construed as limited to the embodiments set forth herein. Rather, these embodiments are provided so that this disclosure will satisfy applicable legal requirements.

As used herein, the term "exemplary" means serving as an example, instance, or illustration. Any aspect or design described herein as "exemplary" is not necessarily to be construed as preferred or advantageous over other aspects or designs. Rather, use of the word exemplary is intended to present concepts in a concrete fashion. In addition, while a particular feature may be disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms "coupled," "fixed," "attached to," and the like refer to both direct coupling, fixing, or attaching, as well as indirect coupling, fixing, or attaching through one or more intermediate components or features, unless otherwise specified herein. As used herein, coupling can be accomplished through for example, welding or bolting one component to another component.

As used herein, the term "positioned directly on" refers to a first component being positioned on a second component such that they make contact. Similarly, as used herein, the term "positioned directly between" refers to a first component being positioned between a second component and a third component such that the first component makes contact with both the second component and the third component. In contrast, a first component that is "positioned between" a second component and a third component may or may not have contact with the second component and the third component. Additionally, a first component that is "positioned between" a second component and a third component is positioned such that there may be other intervening components between the second component and the third component other than the first component.

It is desirable, in some examples, for gearboxes to be as level as possible with respect to the ground. Embodiments of the present disclosure include, but are not limited to, an adjustable angle bracket that, in some examples, allows a gearbox to adjust its angle towards the ground.

Turning now to FIG. 1, an example adjustable angle bracket 100 is provided. In one or more embodiments, adjustable angle bracket 100 is secured to a fixed bracket 145.

In one or more embodiments, the adjustable angle bracket 100 includes a base 105 having a rectangular shape. In one example, the base 105 defines a length L and a width W. In some examples, base 105 is chamfered at each of its four corners.

Additionally or alternatively, base 105 defines a plurality of apertures 106. For example, the plurality of apertures 106 may include four apertures. In some examples, base 105 defines the plurality of apertures 106 at each of its four corners.

In some examples, the plurality of apertures 106 are defined further from the center of base 105 than each of a first lug 110 and a second lug 120. For example, each of the plurality of apertures 106 may be positioned outside of the first lug 110 and the second lug 120 along the width of the base 105.

In one or more embodiments, base 105 is made of a hard or semi-hard material. For example, base 105 may be made of metal (e.g., steel, aluminum, and/or the like), plastic, a composite material, and/or the like.

In one or more embodiments, a first lug 110 having a top edge 112 and a bottom edge 111 is coupled to base 105. In some examples, bottom edge 111 of first lug 110 is coupled to base 105. For example, bottom edge 111 may be coupled to base 105 by welding, bolted joints, and/or the like. For example, first lug 110 is configured to stand perpendicularly on base 105, with top edge 112 extending away from base 105.

In one or more embodiments, first lug 110 extends along the length of base 105. For example, first lug 110 may extend across the entirety of the length of base 105. In some examples, first lug 110 has a triangular shape. For example, first lug 110 may have an isosceles triangle shape. In other examples, first lug 110 may have an irregular quadrilateral shape. In some examples, an angle between bottom edge 111 and top edge 112 is an acute angle. As another example, top edge 112 includes a rectangular protrusion at point of contact 131.

In one or more embodiments, first lug 110 defines a first set of slots 120. In some examples, the first set of slots 120 includes three slots. In some examples, each of the first set of slots 120 has a different angle relative to the base 105. For example, the first set of slots 120 may include slots angled at 0 degrees, 9 degrees, and 18 degrees from a direction D orthogonal to base 105.

In some examples, each of the first set of slots 120 has a different length. For example a length of the slots may increase as they are angled further. In some examples, each of the first set of slots 120 is parallel with a corresponding slot defined on second lug 115.

In one or more embodiments, a second lug 115 having a top edge 117 and a bottom edge 116 is coupled to base 105. In some examples, bottom edge 116 of second lug 115 is coupled to base 105. For example, bottom edge 116 may be coupled to base 105 by welding, bolted joints, and/or the like. For example, second lug 115 is configured to stand perpendicularly on base 105, with top edge 117 extending away from base 105.

In one or more embodiments, second lug 115 extends along the length of base 105. For example, second lug 115 may extend across the entirety of the length of base 105. In some examples, second lug 115 has a triangular shape. For example, second lug 115 may have an isosceles triangle shape. In other examples, second lug 115 may have an irregular quadrilateral shape. In some examples, an angle between bottom edge 116 and top edge 117 is an acute angle. As another example, top edge 117 includes a rectangular protrusion at point of contact 132.

In one or more embodiments, second lug 110 defines a second set of slots 125. In some examples, the second set of slots 125 includes three slots. In some examples, each of the second set of slots 125 has a different angle relative to the base 105. For example, the second set of slots 125 may include slots angled at 0 degrees, 9 degrees, and 18 degrees direction D. In some examples, each of the second set of slots 125 has a different length. For example a length of the slots may increase as they are angled further. In some examples, each of the second set of slots 125 is parallel with a corresponding slot defined on first lug 110.

In one or more embodiments, adjustable angle bracket 100 further includes a lug connector 130. In some examples, lug connector 130 is configured to be coupled to both first lug 110 and second lug 115. For example, lug connector 130 may be coupled to the top edge 112 of first lug 110 and the top edge 117 of second lug 115. For example, lug connector 130 includes a main body extending across a gap between top edge 112 of first lug 110 and top edge 117 of second lug 115.

In one or more embodiments, the main body of lug connector 130 includes two rectangular slots. For example, each of the two rectangular slots may be on the outside of lug connector 130. In some examples, a first slot of the main body of lug connector 130 is configured to be coupled with the rectangular protrusion of top edge 112 of first lug 110 at point of contact 131. In some examples, a second slot of the main body of lug connector 130 is configured to be coupled with the rectangular protrusion of top edge 117 of second lug 115 at point of contact 132.

In one or more embodiments, lug connector 130 includes a first branch 133. In some examples, first branch 133 is coupled to top edge 112 of first lug 110. For example, first branch 133 may extend along a portion of top edge 112. In some examples, first branch 133 has a straight side and a curved side. For example, the curved side of first branch 133 may face towards the second lug 115.

In one or more embodiments, lug connector 130 includes a second branch 134. In some examples, second branch 134 is coupled to top edge 117 of second lug 115. For example, second branch 134 may extend along a portion of top edge 117. In some examples, second branch 134 has a straight side and a curved side. For example, the curved side of second branch 134 may face towards the first lug 110.

In one or more embodiments, the plurality of apertures 106 of base 105 are positioned above a plurality of fixed bracket slots 150 defined by fixed bracket 145. In one or more embodiments, the adjustable angle bracket 100 is secured to the fixed bracket 145 via a plurality of bolts 135. For example, the plurality of bolts 135 may extend through the plurality of apertures 106 and the plurality of fixed bracket slots 150. In some examples, a plurality of washers 136 and a plurality of nuts 137 are used to secure the plurality of bolts 135 against the base 105 of adjustable angle bracket 100.

In one or more embodiments, the plurality of bolts 135, washers 136, and/or nuts 137 are made of a hard material. For example, the plurality of bolts 135, washers 136, and/or nuts 137 may be made of metal.

In one or more embodiments, a bolt 140 may secure a gearbox to the adjustable angle bracket 100 between the first lug 110 and the second lug 115 For example, bolt 140 may extend through one of the second set of slots 125 and one of the first set of slots 120, with the gearbox placed in between the first lug 110 and the second lug 115. In some examples, a washer 141 and a nut 142 are used to secure the bolt 140 to the first lug 110 and the second lug 115 of adjustable angle bracket 100.

In one or more embodiments, the bolts 140, washer 141, and/or nut 142 are made of a hard material. For example, the bolts 140, washer 141, and/or nut 142 may be made of metal.

Turning now to FIG. 2A, a gearbox 200 is shown secured to adjustable angle bracket 100 via bolt 140, washer 141, and nut 142. For example, gearbox 200 is secured to adjustable angle bracket 100 at an orientation so that gearbox 200 is level with a floor. In some examples, gearbox 200 is secured onto a conveyor 220 via shaft 210. In some examples, gearbox 200 is configured to speed up or slow down a conveyor belt of conveyor 220 via shaft 210.

In one or more embodiments, the second set of slots 125 define a plurality of angles relative to a direction D orthogonal to the base 105. For example, the second set of slots 125 may include a first slot 125*a*, a second slot 125*b*, and a third slot 125*c*. In this example, slot 125*a* is angled at 0 degrees from the direction D, slot 125*b* is angled at 9 degrees from the direction D, and slot 125*c* is angled at 18 degrees from the direction D. In this example, slot 125*b* angled at 9 degrees from the direction D is longer than slot 125*a* angled at 0 degrees from the direction D. In this example, slot 125*c* angled at 18 degrees from the direction D is longer than slot 125*b* angled at 9 degrees from the direction D. In some examples, the second set of slots 125 is parallel with first set of slots 120 having the same orientation. In some examples where the gearbox 200 is secured to the adjustable angle bracket 100 by at least one bolt 140 extending through at least one slot of the first set of slots 120 and the at least one slot of the second set of slots 125, the gearbox 200 is configured to be angled in a direction matching the at least one slot of the first set of slots 120 and the at least one slot of the second set of slots 125.

In one or more embodiments, as shown in FIG. 2A, gearbox 200 is secured to adjustable angle bracket 100 via slot 125*a*. In this example, the gearbox 200 is angled at 0 degrees from the direction D orthogonal to the base 105 of fixed bracket 110. In an example where the base 105 of fixed bracket 100 is positioned at an angle parallel to or less than 3 degrees from the ground, this results in gearbox 200 being angled within 3 degrees of the ground.

In one or more embodiments, as shown in FIG. 2B, gearbox 200 is secured to adjustable angle bracket 100 via slot 125*b*. In this example, the gearbox 200 is angled at 9 degrees from the direction D orthogonal to the base 105 of fixed bracket 110. In an example where the base 105 of fixed bracket 100 is positioned at an angle between 6 and 12 degrees from the ground, this results in gearbox 200 being angled within 3 degrees of the ground.

In one or more embodiments, as shown in FIG. 2C, gearbox 200 is secured to adjustable angle bracket 100 via slot 125*c*. In this example, the gearbox 200 is angled at 18 degrees from the direction D orthogonal to the base 105 of fixed bracket 110. In an example where the base 105 of fixed bracket 100 is positioned at an angle between 15 and 21 degrees from the ground, this results in gearbox 200 being angled within 3 degrees of the ground.

Turning now to FIG. 3A, an example gearbox 200 is illustrated angled 18 degrees below the conveyor 220. In this example, gearbox 200 is secured to slot 125*c* and a parallel slot 120*c*.

Turning now to FIG. 3B, an example gearbox 200 is illustrated angled 18 degrees above the conveyor 220. In this example gearbox 200 is secured to slot 125*c* and a parallel slot 120*c*. In contrast to FIG. 3A, the example gearbox 200 is angled above conveyor because the adjustable angle bracket 100 is flipped around. In example embodiments, gearbox 200 may switch orientation from below to above the conveyor 220 or vice versa by flipping the adjustable angle bracket 100 by 180 degrees.

Turning now to FIG. 4A, a bottom view of fixed bracket 145 is shown. In one or more embodiments, fixed bracket 145 is secured to a bottom side of conveyor 220. For example, fixed bracket 145 may be secured to the bottom of conveyor 220 by bolts, washers, nuts, and/or the like. In one or more alternative embodiments, fixed bracket 145 may be secured to conveyor 220 by other means such as welding.

In one or more embodiments, fixed bracket 145 extends across a width of conveyor 220. For example, fixed bracket 145 may extend across the bottom of conveyor 220 and below the shaft 210. For example, fixed bracket 145 may include a portion flush with the bottom of conveyor 220 and two wall portions 421 and 431 perpendicular to the bottom of conveyor 220.

In one or more embodiments, fixed bracket 145 is made of a hard material. For example, fixed bracket 145 may be made of metal.

Turning now to FIG. 4B, a close-up view of a platform 410 of fixed bracket 145 is shown. For example, platform 410 may extend below the shaft 210.

In one or more embodiments, platform 410 is has a rectangular shape extending between first wall 420 and second wall 430. In some examples, platform 410 defines a plurality of fixed bracket slots 150 which may be used to secure a base 105 of an adjustable angle bracket 100. For example, each of the fixed bracket slots 150 may define a length such that adjustable angle bracket 100 may be secured to the base 410 at any point between walls 420 and 430 of the fixed bracket 145 by sliding along platform 410 through fixed bracket slots 150 prior to being fully secured to platform 410. In some examples, platform 410 includes a first rectangular recess at point of contact 411 and a second rectangular recess at point of contact 412.

In one or more embodiments, first wall 420 is perpendicular to platform 410. For example, first wall 420 may be parallel to second wall 430. In some examples, first wall 420 includes a first portion 421 extending underneath conveyor 220 and a second portion 422 extending under shaft 210. In some examples, the first portion 421 of the first wall 420 and the second portion 422 of first wall 420 are connected by a transition portion 423. For example, the transition portion 423 may gradually increase in height as it gets closer to second portion 422. In some examples, second portion 422 of the first wall 420 is greater in height than first portion 421 of first wall 420. In some examples, first wall 420 includes a rectangular protrusion coupled to platform 410 at point of contact 411.

In one or more embodiments, second wall 430 is perpendicular to platform 410. For example, second wall 430 may be parallel to first wall 420. In some examples, second wall 430 includes a first portion 431 extending underneath conveyor 220 and a second portion 432 extending under shaft 210. In some examples, the first portion 431 of the second wall 430 and the second portion 432 of second wall 430 are connected by a transition portion 433. For example, the transition portion 433 may gradually increase in height as it gets closer to second portion 432. In some examples, second portion 432 of the second wall 430 is greater in height than first portion 431 of second wall 430. In some examples, second wall 430 includes a rectangular protrusion coupled to platform 410 at point of contact 412.

Turning now to FIG. 5, an example adjustable angle bracket 100 is illustrated including an example first set of slots 120. In some examples, different sizes, orientations, and dispositions may be selected for the first set of slots 120 and the second set of slots 125. In example embodiments, different sizes, orientations, and dispositions of the slots may be selected based on a type or dimensions of the gearbox 200. For example, slots may be angled at a variety of degrees from direction D and extend over a variety of lengths.

In one or more embodiments, the first set of slots 120 define a plurality of angles relative to a direction D orthogonal to the base 105. For example, the first set of slots 120 may include a first slot 120*a*, a second slot 120*b*, and a third slot 120*c*. In this example, slot 120*a* is angled at 0 degrees from the direction D, slot 120*b* is angled at 9 degrees from the direction D, and slot 120*c* is angled at 18 degrees from the direction D. In this example, slot 120*b* angled at 9 degrees from the direction D is longer than slot 120*a* angled at 0 degrees from the direction D. In this example, slot 120*c* angled at 18 degrees from the direction D is longer than slot 120*b* angled at 9 degrees from the direction D. In some examples, the first set of slots 120 is parallel with second set of slots 125 having the same orientation. In some examples where the gearbox 200 is secured to the adjustable angle bracket 100 by at least one bolt 140 extending through at least one slot of the first set of slots 120 and the at least one slot of the second set of slots 125, the gearbox 200 is configured to be angled in a direction matching the at least one slot of the first set of slots 120 and the at least one slot of the second set of slots 125.

Turning now to FIG. 6, a bottom view of an adjustable gearbox assembly is illustrated. In one or more embodiments, the adjustable gearbox assembly includes conveyor 220, gearbox 200, fixed bracket 145, and adjustable angle bracket 100.

In one or more embodiments, a gearbox 200 may be adjusted to an angle not matching any of the first set of slots 120 or the second set of slots 125. For example, an angle of the gearbox 200 relative to the direction D is adjustable by sliding the adjustable angle bracket 100 along the plurality of fixed bracket slots 150. For example, if the gearbox 200 should be angled at 12 degrees from the direction D, it may be secured to slots 120*b* and 125*b* and the adjustable angle bracket 100 may slide along the fixed bracket slots 150 until the gearbox 200 is angled at 12 degrees from the direction D.

In one or more embodiments, the adjustable gearbox assembly is configured to allow gearbox 200 to be level with the ground or to be angled within 3 degrees of the ground. For example, the combination of securing the gearbox 200 to different slots and sliding adjustable angle bracket 100 along the fixed bracket slots 150 allow the gearbox 200 to maintain a level position when the conveyor is angled away from the ground. For example, adjustable angle bracket 100 may allow the gearbox 200 to maintain a level position when the conveyor is angled up to 18 degrees from the ground. In example embodiments, this allows for a longer lifespan for gearbox 200 as it will operate with proper oil levels.

Conclusion

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the appended claims below. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An adjustable angle bracket, comprising:
a base having a rectangular shape; and
a first lug having a top edge and a bottom edge, wherein the bottom edge of the first lug is coupled to the base, and wherein the first lug defines a first set of slots; and
a second lug having a top edge and a bottom edge, wherein the bottom edge of the second lug is coupled to the base, and wherein the second lug defines a second set of slots,
wherein each of the first lug and the second lug has a triangular shape,
wherein the first set of slots define a plurality of angles relative to a direction D orthogonal to the base,
wherein the second set of slots define the plurality of angles relative to the direction D, and
wherein the first set of slots are distinct and spaced apart from one other along a direction orthogonal to the direction D, and wherein the second set of slots are distinct and spaced apart from one other along the direction orthogonal to the direction D.

2. The adjustable angle bracket of claim 1, wherein each of the first set of slots and the second set of slots comprises three slots.

3. The adjustable angle bracket of claim 2, wherein each of the first set of slots and the second set of slots comprises slots angled at 0 degrees, 9 degrees, and 18 degrees from the direction D.

4. The adjustable angle bracket of claim 3, wherein a slot angled at 9 degrees from the direction D is longer than a slot angled at 0 degrees from the direction D, and wherein a slot angled at 18 degrees from the direction D is longer than the slot angled at 9 degrees from the direction D.

5. The adjustable angle bracket of claim 1, wherein the base defines a plurality of apertures.

6. The adjustable angle bracket of claim 5, wherein the plurality of apertures comprises four apertures.

7. The adjustable angle bracket of claim 6, wherein the base comprises a center, and wherein the plurality of apertures are defined further from the center than each of the first lug and the second lug.

8. The adjustable angle bracket of claim 1, further comprising a lug connector coupled to the top edge of the first lug and the top edge of the second lug.

* * * * *